June 23, 1970     C. O. BROMARKER     3,516,579
PORTION DISPENSER, MORE PARTICULARLY FOR FEEDING CATTLE
Filed March 19, 1968
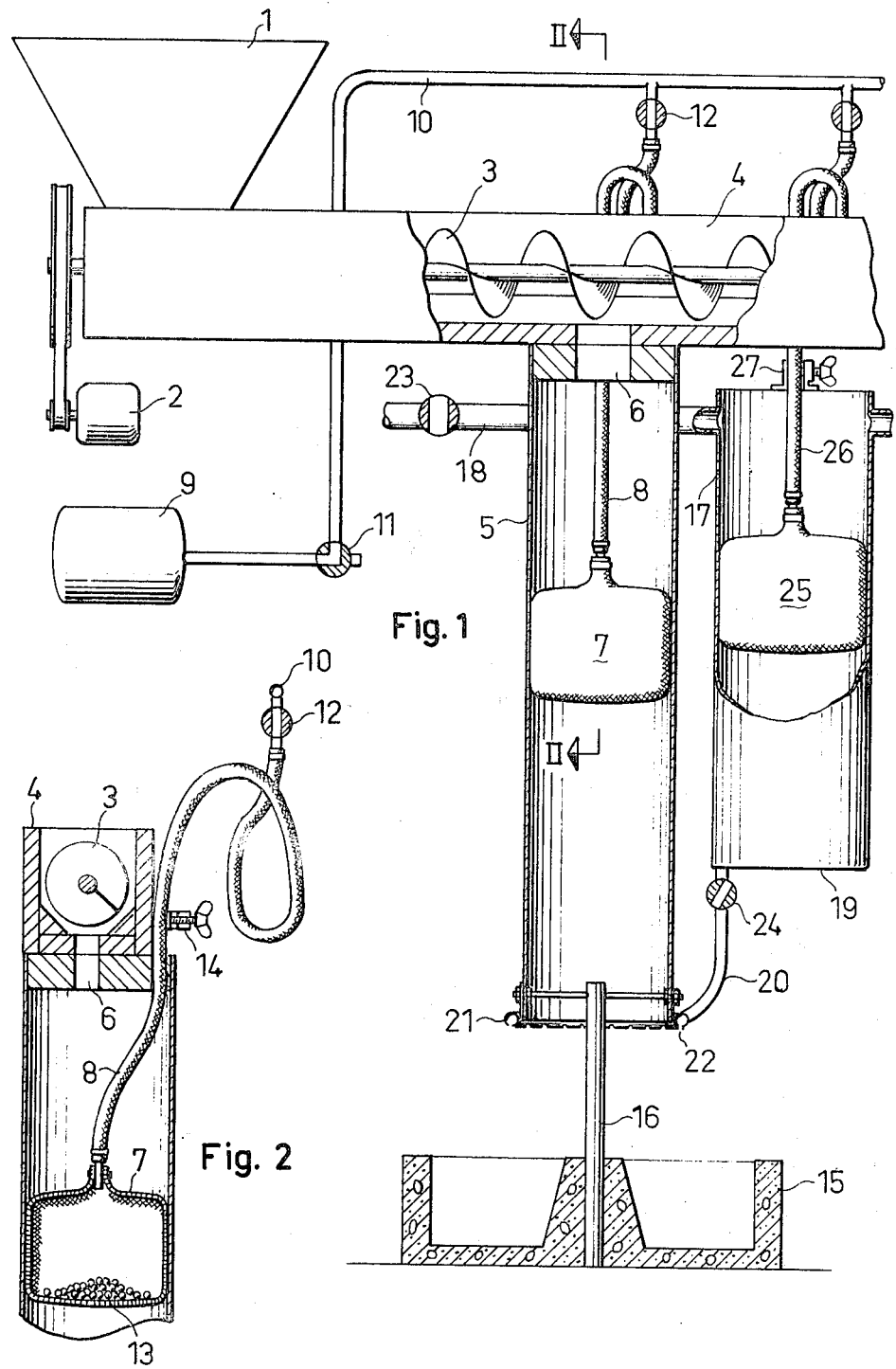
INVENTOR.
Carl Olof Bromarker
BY
Pierce, Scheffler & Parker
attorneys

United States Patent Office 3,516,579
Patented June 23, 1970

3,516,579
PORTION DISPENSER, MORE PARTICULARLY FOR FEEDING CATTLE
Carl Olof Bromarker, Bronas sateri,
Lidkoping, Sweden
Filed Mar. 19, 1968, Ser. No. 714,282
Int. Cl. G01f 11/28
U.S. Cl. 222—440                                    4 Claims

ABSTRACT OF THE DISCLOSURE

A portion dispenser system is provided for discharging predetermined portions of loose solid or liquid material. The dispenser is particularly useful for dispensing food portions to cattle in cattle pens. The system comprises a number of food containers having an individually adjustable effective volume corresponding to the portion to be discharged. A conveyor supplies food from a food storage or supply to the containers. The containers are substantially vertical tubes. Each container contains a flexible balloon which forms a closed bottom of the container, when inflated. The balloons are connected to a compressed air supply through pipes and cocks so that they can be inflated and collapsed. The container space above the inflated balloons are filled with food by the conveyor, the food being discharged by releasing the pressure of the balloons. The level of the belloons within the containers and, thus, the effective volume determining the volume of the food portions may be varied by lifting and lowering the balloons, preferably by flexible compressed-air pipes connecting the balloons with the compressed-air supply. Thus, the balloons serve as kind of valves and movable container bottoms of variable level.

---

This invention relates to a portion dispensing system, more particularly for dispensing predetermined portions of loose material such as grain, cereals, flour, chips, shavings, pellets, liquids, etc.

It is known to control and supervise the feeding of cattle by mechanical food dispensers distributing predetermined quantities of food etc. to individual animals or groups of animals occupying separate pens, folds or cages. Such known apparatus have the disadvantage, however, that changing of the quantity of the portions to be periodically dispensed is troublesome and requires an intricate and expensive system. Disturbance of the service may readily occur in that the food may clog discharge outlets and valves.

It is the object of the invention to provide a simple, cheap and reliable system making possible a simple control of the quantity of portions to be discharged.

According to the invention the system includes a container comprising a tube having a valve means which acts as a movable bottom of the container and substantially comprises a balloon or bag which consists of a flexible, preferably resilient, material and, when inflated, fills up the cross-sectional area of the tube, and which may be filled with a gas and emptied through a pipe to close and to open, respectively, the valve.

An embodiment of the invention will now be described, by way of example only, with reference to the accompanying drawing of which FIG. 1 shows the system and FIG. 2 shows a longitudinal vertical section along line II—II of FIG. 1 of part of the system shown in FIG. 1.

Loose solid material such as chopped feeding stuff, grain, chips, pellets or similar food slides from a magazine 1 to conveyor screw (auger) 3 being driven by a motor 2 and rotating in a conveyor chute 4 to supply said loose material to a container 5. The screw conveyor 4, 5 may extend above a row of containers located one after another along the conveyor, depending on the number of desired food dispenser places. The bottom of chute 4 is provided with apertures 6, one for each container 5. The material moved by the conveyor screw 3 drops through the aperture 6 into the container until the container is filled. Then, further material supplied by the conveyor is moved to the next container until this container is filled too, etc. Finally, the drive of the screw 3 may be stopped either manually or automatically.

The container consists substantially of a vertical tube the lower end of which is entirely open if serving for discharging of solid material. Preferably, the tube is cylindrical and has a substantially uniform diameter. A bag or balloon 7 of inflatable material such as rubber or rubber-covered fabric or similar material is suspended in the tube from a flexible pipe or hose 8. This pipe is connected to a compressed gas tank 9 through a pipe system 10 through which pressurized gas such as compressed air may be supplied to the balloon 7. Thereby the balloon is inflated to engage the inner wall of the tubular container 5 such as to form kind of stop cock or shutoff valve for the material filled into the container volume above the balloon 7. The tube system 10 includes a three-way cock or valve 11 which connects the tube system 10 to the tank 9 in one position of the cock and to the free atmosphere under simultaneous shutting-off of the tank 9 in the other position. The pipe 8 is connected through a shut-off cock or a valve to the pipe 10 to block the connection to one or more balloons 7 whereas the connection to the remaining balloons of the system is open. The balloon 7 preferably is cylindrical, at least when inflated, to achieve a large area of contact with the container 5. The balloon contains a solid or liquid internal load such as gun shot 13 so that when the internal pressure of the balloon is released, the balloon, when collapsing, is longitudinally extended and, thus, the horizontal cross-sectional area is considerably decreased to a minimum. The pipe is flexible and extends within the container upwards to the lateral wall of the chute 4 where it is fixed by a clamp 14 (FIG. 2), Hence, the balloon 7 may be lifted and lowered in the container 5 to vary the volume of the container above the balloon. The pipe 8 may be provided with marks or a scale to indicate the level of the balloon in the container.

Below the container, a circular trough or manger 15 is provided to collect the loose material resting upon the balloon and dropping down when the balloon is collapsed. A stationary post 16 is provided in the centre of the trough 15 to support the container and the auger system 3, 4, this post being set in the concrete of the trough 15 or fixed in another way.

The operation of the portion dispenser system is as follows.

The position of the balloon 7 is adjusted to the desired level determining the individual food portions to be dispensed every time the food dispenser is actuated by releasing the pressure of the balloons. Then, the cocks 11 and 12 are opened so that compressed gas, such as compressed air, is supplied to the balloon whereby the desired effective container volume is determined by inflating the balloon to form a closed bottom of said volume. Food is supplied to the auger 3 which, by then, is moving, or the auger is continuously communicating with the magazine 1 and is switched on. The food moved by the auger screw drops through the opening 6 into the container 5 until the container is filled to the upper rim thereof. Thus, if the conveyor continues to supply food, such further food will be passed to the next container etc., and the supply of food is manually or automatically interrupted when the last container to be filled has been filled. When the food is to be dispensed, the pressure within the balloon is released by switching the cock 11 so that the balloon collapses. The balloon is compressed by the weight of the food resting on the balloon and by the internal gun shot load 13 so that said food quickly slides or drops down into the trough 15. If, then, the communication from the balloon to the tank 9 is re-established by the cock 11, the next food portion dispensing process may begin whenever desired.

As mentioned above, the container 5 is designed for solid loose material. Normaly, also water should be supplied to the trough 15 when feeding cattle. Such water supply may be effected by an arangement similar to that used for solid food. The water container may be, for example, a tube 17 which may be open at the top and is connected to a water pipe 18, and the water level may be controlled by a central float valve such as not to exceed a level below the upper rim of the container 17. The bottom 19 of the container 17 is closed and the container is connected through a pipe 20 to a discharge tube 21 provided with a plurality of holes 22 directed downwards. Control valves 23 and 24 are provided in the pipes 18 and 20, respectively. The container 17 contains a collapsible balloon 25 and a flexible pipe 26, which are of a similar type as the balloon 7 and pipe 8 in the container 5. The balloon 25 is kept at a desired level by a clamp 27 fixing the suspending pipe 26. Also the pipe 26 is connected to the compressed gas pipe system 10 that pressure is simultaneously supplied to, and removed from, the balloons 7 and 25. When releasing the pressure of the balloon 25, the balloon is collapsed so that the water quantity predetermined by the container volume between the top of the balloon and said controlled water level is discharged into the trough 15 and forms kind of conical veil or shower surrounding the food simultaneously dropping down into the trough. In this way, the required quantity of liquid is admixed to the food and the distribution of food particles and dust is prevented.

The object of the invention may be realised in another way and the dispenser system described above may be modified. For example, the balloon may be spherical, i.e. may have the shape of a ball and the system may be automatically controlled at intervals by a timer or electric clock controlling the conveyor 2, 3 and the change-over valve 11.

What I claim is:
1. A system for dispensing portions of fluent solids or liquid material at spaced locations, more particularly a system for dispensing food in cattle stables such as grain, flour or other cereals, chips, pellets and water, wherein at least one container to be supplied with such material is provided at each of said locations, said container being provided with valve means for closing the lower end of an effective container volume within the container, which valve means in the open position thereof permits the passage and discharge of the material accumulated above the valve means, said valve means comprising a flexible balloon which when inflated fills up the internal cross-sectional area of the container and is connected through a pipe to a compressed gas source such as to be inflated to close the container and to be released from pressure to collapse and open the container, said pipe serving to suspend said balloon and being extended upwardly through the effective container volume to said source, and clamping means for adjustably securing said pipe in place within said effective container volume at different distances above its connection point to said balloon thereby to effect a corresponding adjustment in the effective container volume above the balloon.

2. A system as claimed in claim 1, wherein the form of the balloon when inflated is substantialy cylindrical and the balloon contains an internal load.

3. A system as claimed in claim 1, and comprising at each of said locations a first container for dispensing fluent solid material and a second container for dispensing a liquid, the two compressed gas pipes of the two containers being connected in parallel to make possible simultaneous dispensing of portions from the two containers by simultaneous release of the pressure of the associated balloons.

4. A system as claimed in claim 3 wherein a liquid discharge pipe line extends from the lower part of the second container to the discharge outlet of the first container and substantially encircles said outlet.

References Cited

UNITED STATES PATENTS

| | | | |
|---|---|---|---|
| 1,580,988 | 4/1926 | Allstott | 222—330 X |
| 2,811,288 | 10/1957 | Willis | 222—440 X |
| 2,889,892 | 6/1959 | Schaub et al. | 222—450 X |

SAMUEL F. COLEMAN, Primary Examiner